United States Patent [19]

Nishii et al.

[11] Patent Number: 5,627,678
[45] Date of Patent: May 6, 1997

[54] FOURIER TRANSFORM OPTICAL APPARATUS AND OPTICAL INFORMATION

[75] Inventors: Kanji Nishii, Osaka; Kenji Takamoto, Neyagawa; Masami Ito, Moriguchi; Atsushi Fukui, Osaka, all of Japan

[73] Assignee: Matsushita Electric Industrial Co., Ltd., Osaka, Japan

[21] Appl. No.: 404,900

[22] Filed: Mar. 15, 1995

[30] Foreign Application Priority Data

Mar. 15, 1994 [JP] Japan .................................. 6-044260

[51] Int. Cl.$^6$ .................................................. G02B 27/46
[52] U.S. Cl. ........................ 359/561; 359/559; 359/822
[58] Field of Search .............................. 359/561, 562, 359/559, 789; 382/210, 211, 212; 364/822

[56] References Cited

U.S. PATENT DOCUMENTS

| | | | |
|---|---|---|---|
| 5,363,455 | 11/1994 | Nishii et al. | 382/211 |
| 5,383,056 | 1/1995 | Nshii et al. | 359/561 |

FOREIGN PATENT DOCUMENTS

| | | |
|---|---|---|
| 5-210139 | 8/1993 | Japan . |
| 5-210141 | 8/1993 | Japan . |

*Primary Examiner*—Jon W. Henry
*Attorney, Agent, or Firm*—Wenderoth, Lind & Ponack

[57] ABSTRACT

A Fourier transform optical apparatus for optically Fourier transforming an input image includes a spatial light modulator for displaying an input image, a light source for irradiating the input image on the spatial light modulator, a first convex lens and a first concave lens arranged near the spatial light modulator and a second convex lens arranged at the composite focal plane of the first convex lens and first concave lens. The respective focal lengths of these three lenses are determined to satisfy conditions such that a light ray passing an intersection of the spatial light modulator and an optical axis of the Fourier transform optical apparatus becomes a light ray parallel to the optical axis after passing the second convex lens and a light ray incident to the first convex lens in parallel to the optical axis is focused at the composite focal point of the first convex lens, first concave lens and the second convex lens.

8 Claims, 8 Drawing Sheets

FOURIER TRANSFORM OPTICAL APPARATUS AND OPTICAL INFORMATION

BACKGROUND OF THE INVENTION

1. Field of the Invention

The present invention relates to Fourier transform optical apparatus for optically performing image processing or image recognition used by visual recognition systems such as robots.

2. Description of the Related Art

Image processing or image recognition technology in recent years has required processing of a large number of pixels at high speed. Therefore, the optical information apparatus which is capable of high-speed parallel operations has been aggressively developed.

As an example of a prior optical information processing apparatus, the optical information processing apparatus disclosed in Japanese laid-open publication Hei. 2-132412 is described.

FIG. 8 shows the configuration of the prior optical information processing apparatus. In FIG. 8, a reference numeral 20 is a TV camera, 21 is a first liquid crystal display (LCD) that displays an image picked up by TV camera 20, 22 is a semiconductor laser, 23 is a collimating lens that makes parallel rays of the light from the semiconductor laser, and 24 is a first lens. First LCD 21 is set at the front focal plane of first lens 24. 25 is a second LCD and set at the back focal plane of first lens 24.

26 is a read only memory (ROM) that stores the data of Fourier transformed computer generated holograms for the sample point of each pixel on the second LCD for a plurality of reference patterns, that is, the data of impressed voltages corresponding to the transmittance of each pixel on the second LCD 25. 27 is a second lens, and second LCD 25 is arranged at its front focal plane. 28 is a photodetector arranged at the back focal plane of second lens 27.

The operation of the conventional optical information processing apparatus configured as above is described.

First, when TV camera 20 picks up an object, its image is displayed on first LCD 21, while the LCD is irradiated with coherent light emitted from semiconductor laser 22 and collimated by collimating lens 23.

Since first LCD 21 is placed at the front focal plane of first lens 24, a Fourier transform image of the object transformed by first lens 24 is formed on the back focal plane of first lens 24, i.e. on second LCD 25.

At the same time, a Fourier transform image of a particular reference pattern is displayed on second LCD 25 as an optical filter. This image is displayed as a form of Fourier transform computer generated hologram by spatially modulating the transmittance of each pixel of second LCD 25 based on an input signal produced from the data stored in ROM 26. Accordingly, the Fourier transform image of the input object image on first LCD 21 transformed by first lens 24 and the Fourier transform image calculated beforehand from a particular reference pattern are superimposed on second LCD 25.

Further, since second LCD 25 is set at the front focal plane of second lens 27, if the two Fourier transform images of the object and the reference pattern coincide, a luminescent spot is formed on the second focal plane of second lens 27 and detected by photo detector 28.

In this way, optical image processing perform in which an optical filter of a computer generated hologram displayed on second LCD 25 functions as a matched filter.

However, the above configuration has a problem in that the length of the light path becomes long, so that the size of the apparatus becomes large for the following reasons.

Assuming the wavelength of semiconductor laser 22 is $\lambda$, the pixel pitch of first LCD is P, and the diameter of the Fourier image displayed on second LCD 25 is D, then the focal length f of first lens 24 is given by $f=D \times P/\lambda$. Therefore, if $P=50$ µm, $\lambda=0.8$ µm and $D=60$ mm, then a lens of $f=3125$ mm is required. Consequently, the distance between first LCD 21 and second LCD 25 shown in FIG. 8 becomes an exceedingly long $2 \times f=6250$ mm.

SUMMARY OF THE INVENTION

In light of the above problem, the object of the present invention is therefore to provide Fourier transform lenses that shorten the light path.

In order to achieve the aforementioned objective, a Fourier transform optical apparatus of the present invention comprises a first convex lens arranged near a display means of an input image, a concave lens, and a second convex lens arranged near the composite focal plane of the first convex lens and concave lens. Here, assuming the composite focal length of the Fourier transform optical apparatus is fs, the focal length of the first convex lens is f1, the focal length of the concave lens is f2, and the front focal length and back focal length of the Fourier transform apparatus are respectively Ff and Bf, the distance x between the concave lens and the first convex lens and the distance d1 between the first convex lens and concave lens are given by $$x=|f2|-f1 \cdot |f2|/fs,$$

$$d1=f1-x,$$

the distance B between the concave lens 3 and the back focal plane of the compound first convex lens and the concave lens is given by $$B=(x \cdot |f2|)/(-x+|f2|),$$

the distance S1 between the first convex lens and the virtual image point of the first convex lens is given by $$S1=(f1-Ff)/(Ff-f1),$$

the distance S' between the front focal planes of the second convex lens and the concave lens is given by $$S'=-\{(d1+S1) \cdot |f2|\}/(d1+S1+|f2|),$$

and the focal length f3 of the second convex lens is given by $$f3=B-Bf-S'.$$

Further, a facet of the Fourier transform optical apparatus of the present invention comprises a first convex lens arranged near the display means of the input image, a concave lens, and a second convex lens arranged near the composite focal plane of the first convex lens and concave lens. Here, assuming the composite focal length of the Fourier transform optical apparatus is fs, the focal length of the first convex lens is f1, the focal length of the concave lens is f2, and the front focal length and back focal length of the Fourier transform apparatus are respectively Ff and Bf, then the distance x between the concave lens and the first convex lens and the distance d1 between the first convex lens and concave lens are given by $$x=|f2|-f1\cdot|f2|/fs,$$

$$d1=f1-X,$$

the distance B between the concave lens 3 and the back focal plane of the compound the first convex lens and concave lens is given by $$B=(x\cdot|f2|)/(-x+|f2|),$$

the distance S1 between the first convex lens and the virtual image point of the first convex lens is given by $$S1=(f1\cdot Ff)/(Ff-f1),$$

the distance S' between the front focal plane of the second convex lens and the concave lens is given by $$S'=-\{(d1+S1)\cdot|f2|\}/(d1+S1+|f2|),$$

the focal length f3 of the second convex lens is given by $$f3=B-Bf-S',$$

and the focal length f1 of the first convex lens is equal to the focal length f3 of the second convex lens.

Still further, another facet of the Fourier transform optical apparatus of the present invention comprises a first convex lens obtained by cementing a convex lens and a concave lens and arranged near the display means of the input image, a concave lens obtained by cementing a convex lens and a concave lens, and a second convex lens which is the same as the first convex lens but arranged with its faces reversed near the composite focal plane of the first convex lens and the concave lens. Here, assuming the composite focal length of the Fourier transform optical apparatus is fs, the focal length of the first convex lens is f1, the focal length of the concave lens is f2, and the front focal length and back focal length of the Fourier transform apparatus are respectively Ff and Bf, then the distance x between the concave lens and the first convex lens and the distance d1 between the first convex lens and concave lens are given by $$x=|f2|-f1\cdot|f2|/fs,$$

$$d1=f1-x,$$

the distance B between the concave lens 3 and the back focal plane of the compound the first convex lens and concave lens is given by $$B=(x\cdot|f2|)/(-x+|f2|),$$

the distance S1 between the first convex lens and the virtual image point of the first convex lens is given by $$S1=(f1\cdot Ff)/(Ff-f1),$$

the distance S' between the front focal plane of the second convex lens and the concave lens is given by $$S'=-\{(d1+S1)\cdot|f2|\}/(d1+S1+|f2|),$$

and assuming the radius of curvature of the cemented surface of the concave lens is r5 then $$0.9\times f2 < r5,$$

the refraction indices of the glass materials of the concave lens and convex lens that constitute the concave lens are respectively n4 and n5, then $$0.1 < n4-n5 < 0.3,$$

assuming the radius of curvature of the non-cemented surfaces of the first convex lens is r1, then $$0.4\times f1 < r1 < 0.75\times f1,$$

or assuming the refraction indices of the glass materials of the convex lens and concave lens that constitute the first convex lens are respectively n1 and n2, then $$0.15 < n2-n1 < 0.25.$$

The Fourier transform optical apparatus of the present invention can shorten the length of the light path by composing its lens system of a first convex lens arranged near the display medium of the input image, a concave lens, and a second convex lens arranged near the composite focal plane of the first convex lens and concave lens.

The Fourier transform optical apparatus of the present invention also can shorten the length of the light path by composing its lens system of a first convex lens set near the display medium of the input image, a concave lens, and a second convex lens set near the composite focal plane of the first convex lens and concave lens. Further, it can also cut down on the costs of the optical system by equalizing the focal length of the first and second convex lenses.

Further, the Fourier transform optical apparatus of the present invention can shorten the length of the light path and can obtain good characteristics of image formation by composing its lens system of a first convex lens obtained by cementing a convex lens and a concave lens and arranged near the display medium of the input image, a concave lens obtained by cementing a convex lens and a concave lens, and a second convex lens which is the same as the first convex lens but arranged with its faces reversed near the composite focal plane of the first convex lens and the concave lens.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

The preferred embodiments according to the present invention will be described below with reference to the attached drawings.

Figure 1:
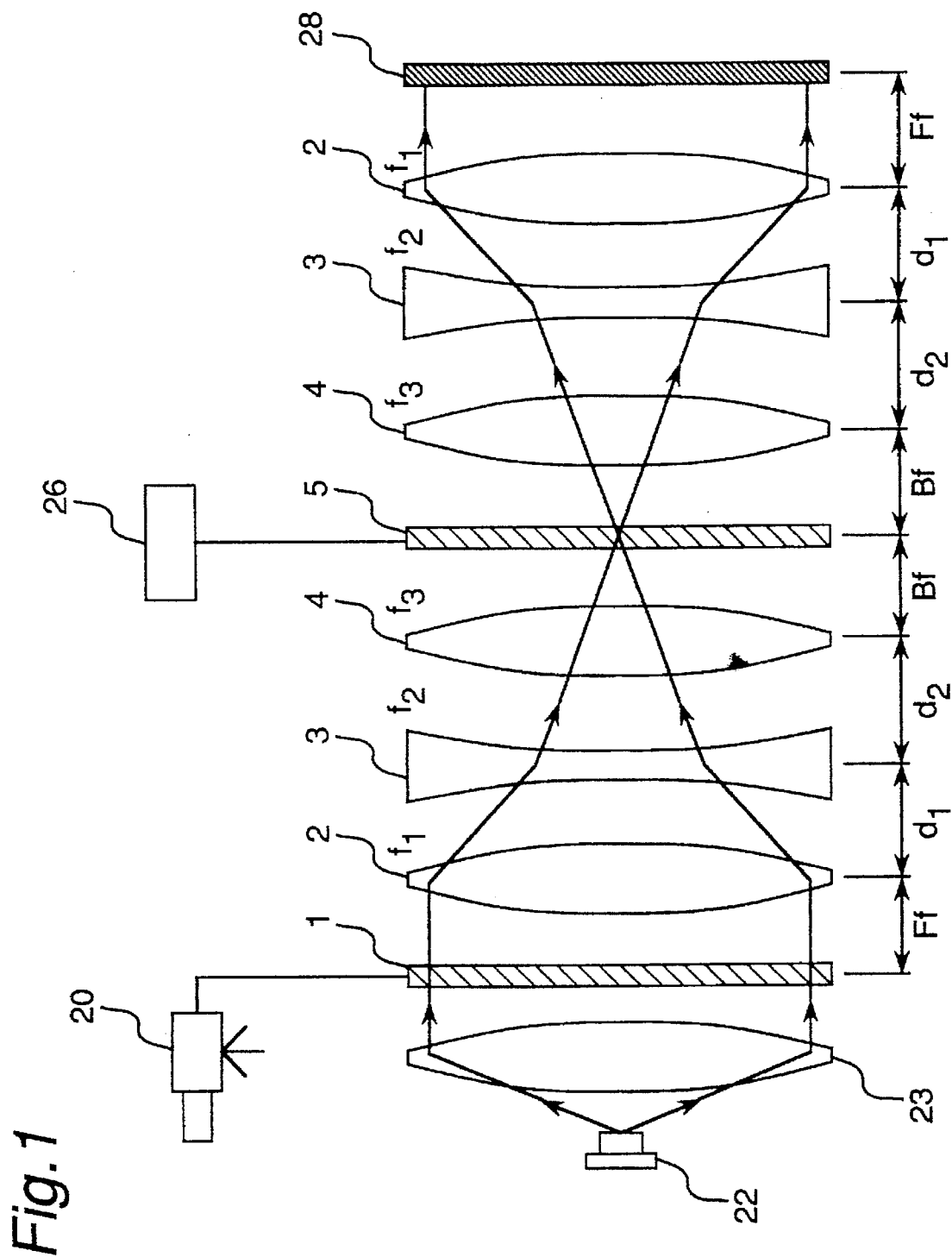
FIG. 1 shows a block diagram of an embodiment of the optical information processing apparatus which includes a Fourier transform optical apparatus according to the preferred embodiment.
Figure 2:
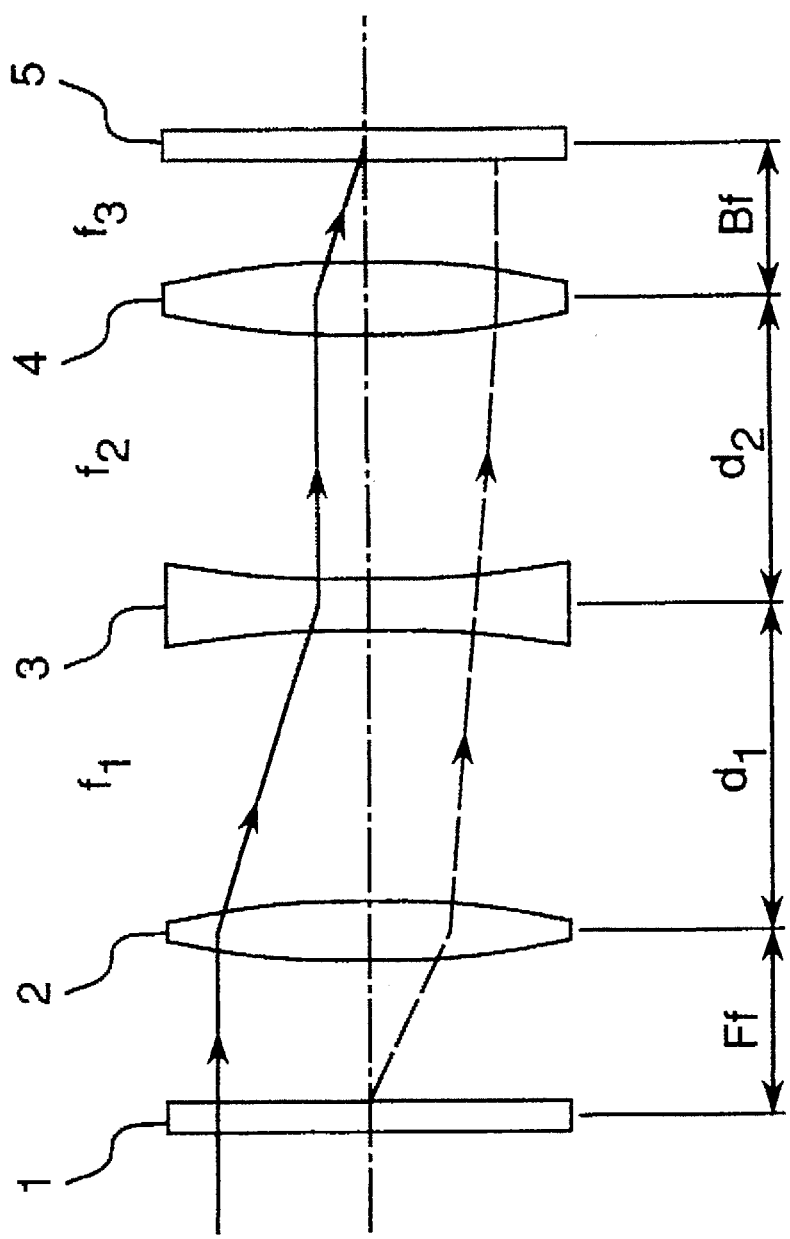
FIG. 2 shows a block diagram of a first embodiment of the Fourier transform optical apparatus defined in claim 1 of the present invention employed in FIG. 1.

FIG. 1 shows a schematic side view of an embodiment of the optical information processing apparatus providing with a Fourier transform optical apparatus according to the present invention and FIG. 2 shows a composition of the Fourier transform optical apparatus employed in FIG. 1.

As shown in FIG. 1, a first spatial light modulator 1 displays an input image picked up by a TV camera 20. The input image displayed on the first spatial light modulator 1 is irradiated with a laser beam emitted from a laser diode 22 and collimated by a collimator lens 23.

On the back side of the first spatial light modulator 1, a first convex lens 2 of focal length f1 and concave lens 3 of focal length f2 and a second convex lens 4 of focal length f3 are arranged to project a Fourier transformed image of the input image on a second spatial light modulator 5. The second spatial light modulator 5 is provided for displaying a Fourier transform CGH (Computer Generated Hologram) of a reference image or pattern having been stored in a ROM 24 beforehand thereby superimposing the Fourier transformed input image and the Fourier transform CGH of a reference image.

Between the second spatial light modulator 5 and a photodetector 28, a lens system for inverse-Fourier transforming a superimposed image on said second spatial light modulator 5 is arranged. The lens system has an arrangement structure symmetric to the lens system arranged between the first spatial light modulator 1 with respect to the second spatial light modulator 5. Namely, a second convex lens 4 of focal length f3, a first concave lens 3 of focal length f2 and a first convex lens 2 of focal length f1 are arranged from the side of the second spatial light modulator 5 toward the photodetector 28. If an input image and a reference pattern coincide with each other, an iluminant spot is formed on the photodetector 28 thereby recognizing the input image.

In FIGS. 1 or 2, Ff is the front focal length, i.e. the distance between first spatial light modulator 1 and first convex lens 2; d1 is the distance between first convex lens 2 and concave lens 3; d2 is the distance between concave lens 3 and second convex lens 4; Bf is the back focal length, i.e. the distance between second convex lens 4 and second spatial light modulator 5. Further, the solid line shows image formation of the pupil, and the broken line shows image formation of the object.

The functions of Fourier transform optical apparatus in an optical information processing system are considered in the following way. The first basic function required for Fourier transform optical apparatus is to ensure good image formation of the pupil, in other words, the preservation of phase information, that is, to ensure that plane waves are transferred as plane waves.

The second basic function is to ensure image formation of the object, in other words the preservation of amplitude information, that is, to ensure that a point is transferred as a point.

Therefore, the functions of image formation of the pupil and object are assigned to the lenses as follows. First, the function of image formation of the pupil is taken over by first convex lens 2, concave lens 3, and second convex lens 4. In particular, first convex lens 2 and concave lens 3 constitute a sub-lens system commonly called telephotolens to shorten Bf. Further, second convex lens 4 ensures as a phase compensation lens that plane waves are transferred as plane waves.

On the other hand, the function of image formation of the object is taken over by concave lens 3 and second convex lens 4, which constitute a reverse telephoto system to shorten Ff. Further, first convex lens 2, concave lens 3, and second convex lens 4 constitute a focal system for object points on first spatial light modulator 1. This focal system and the phase compensation by second convex lens 4 for image formation of the pupil are realized on the same design conditions.

If a desired composite focal length of the lens system is fs, then relationships among the focal lengths f1 to f3 of the three lenses and the air gaps d1, d2, Ff, Bf are approximately obtained in the following based on the relationships illustrated in FIGS. 3 and 4.

Figure 3:
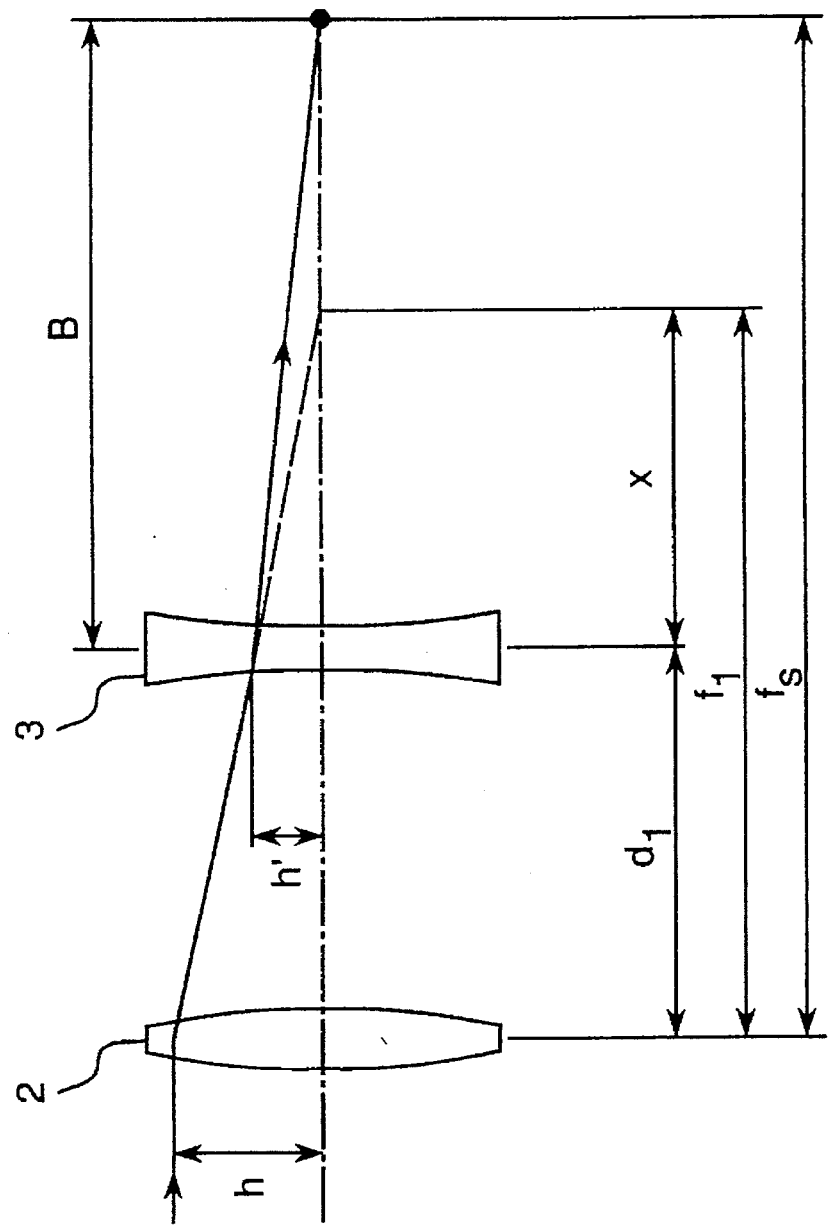
FIG. 3 shows the cross section of the lens system that illustrates image formation of the pupil in the embodiment of FIG. 2.
Figure 4:
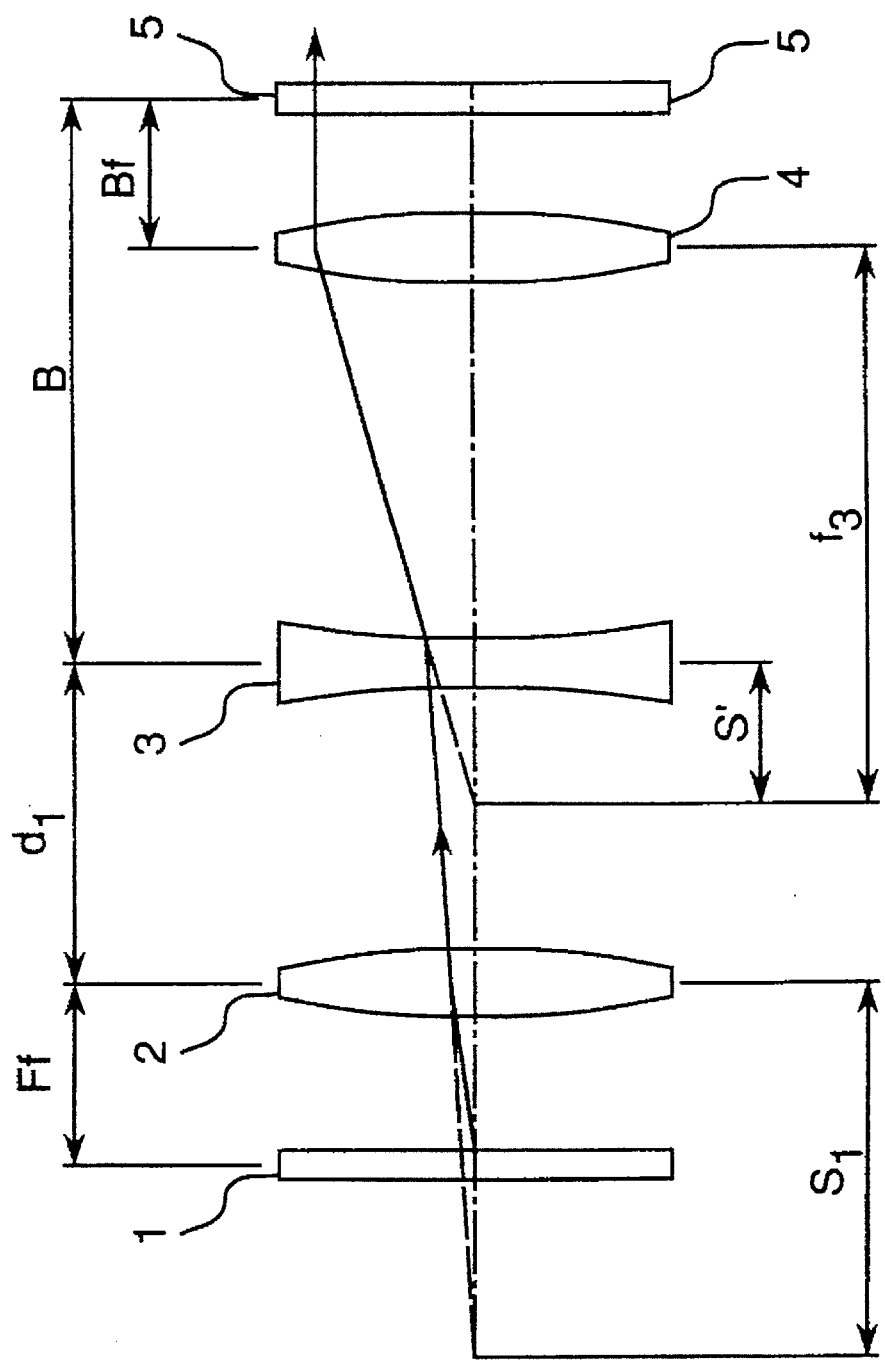
FIG. 4 shows the cross section of the lens system that illustrates image formation of the object in the embodiment of FIG. 2.

FIG. 3 shows image formation of the pupil. Since second convex lens 4 is placed near the back focal plane where second spatial light modulator 5 is set, second convex lens 4 only slightly affects the composite focal length fs. Therefore, the composite focal length fs is regarded as the composite focal length of first convex lens 2 and concave lens 3.

In FIG. 3, components having the same functions as in FIG. 1 are denoted by the same numerals. Also, B is the distance between concave lens 3 and the back focal plane of the compound first convex lens 2 and concave lens 3, x is the distance between concave lens 3 and the back focal plane of first convex lens 2, h is ray height at first convex lens 2, and h' is ray height at concave lens 3.

Then, assuming that $f_s \gg h$ and $f_1 \gg h$, the relationships on angles of the ray show that $$h/fs = h'/B, \quad (1a)$$

$$h/f1 = h'/x. \quad (1b)$$

Therefore, the following equation (1) is obtained:

$$B = h' \cdot fs/h = x \cdot fs/f1. \quad (1)$$

On the other hand, from the lens equation of concave lens 3, it follows $$-1/x + f1/B = -1/|f2|. \quad (2)$$

Therefore, by substituting B in the equation (2) with (1), $$-1/x+f1/x \cdot fs=(f1/fs-1)/\ x=-1/|f2|$$

is obtained, so that x and d1 are obtained as $$x=|f2|-f1 \cdot |f2|/fs, \quad (3)$$

$$d1=f1-x. \quad (4)$$

Further, since the equation (2) is equivalent to $$B=-1/|f2|+1/x=(-x+|f2|)/(x \cdot |f2|),$$

B is obtained by the following equation (5):

$$B=(x \cdot |f2|)/(-x+|f2|). \quad (5)$$

Next, using image formation of the object illustrated in FIG. 3, relationships among relevant quantities are obtained. In FIG. 4, components having the same functions as in FIGS. 1 or 2 are denoted by the same numerals.

S1 is the distance between first convex lens and the virtual image point of first convex lens 2 realized when the object point is on first spatial light modulator 1, and S' is the distance between the front focal plane of second convex lens 4 and concave lens 3.

From the lens equation of first convex lens 2

$$1/Ff+1/S1=1/f1,$$

S1 is obtained by the following equation (6):

$$S1=(f1-Ff)/(Ff-f1). \quad (6)$$

Next, from the lens equation of concave lens 3

$$1/(d1+S1)+1/S'=-1/|f2|.$$

S' is obtained by the following equation (7):

$$S'=-\{(d1+S1) \cdot |f2|\}/(d1+S1+|f2|). \quad (7)$$

Finally, the focal length f3 of second convex lens 4 is obtained, from the condition of being focal, as $$f3=B-Bf-S'. \quad (8)$$

From the above relationships, the Fourier transform optical apparatus defined in claim 1 can be designed by the following procedure:

Step 1. Give the composite focal length fs, focal length f1 of first convex lens 2, focal length f2 of concave lens 3, front focal length Ff, and back focal length Bf.

Step 2. Obtain x, the distance between concave lens 3 and the back focal plane of first convex lens 2, by the equation (3).

Step 3. Using this value of x, obtain d1, the distance between first convex lens 2 and concave lens 3, from the equation (4), and obtain B from the equation (5).

Step 4. Obtain f3 from the equation (8), which represents a relationship on image formation of second convex lens, i.e. the condition of being focal.

The dimensions of a Fourier transform apparatus calculated by the above procedure are shown in Tables 1 and 2. Table 1 shows given input values determined from the characteristics of the spatial light modulator and the like, and Table 2 shows various values calculated by the above procedure.

TABLE 1

| Symbol | Description | Value (mm) |
|---|---|---|
| fs | Composite focal length | 3125 |
| f1 | Focal length of first convex lens | 1000 |
| f2 | Focal length of concave lens | −200 |
| Ff | Front focal length | 50 |
| Bf | Back focal length | 50 |

TABLE 2

| Symbol | Description | Value (mm) |
|---|---|---|
| x | Distance between concave lens and first convex lens | 136 |
| B | Distance between concave lens and the back focal plane of compound first convex lens and concave lens | 425 |
| S1 | Distance between first convex lens and the virtual image point of first convex lens | 53 |
| S' | Distance between concave lens and the front focal plane of second convex lens | 164 |
| d1 | Distance between first convex lens and concave lens | 864 |
| d2 | Distance between concave lens and second convex lens | 375 |
| f3 | Focal length of second convex lens | 539 |

As a result of the above calculation, the total length of the lens system is d1+d2=1239 mm. With the addition of the back focal length Bf and front focal length Ff, the total length of the Fourier transform optical apparatus becomes 1339 mm.

Consequently, the present embodiment has a great effect that the total length of the optical system can be reduced to 21.4% of the prior system of 6250 mm in total length.

Next, a second embodiment of the Fourier transform optical apparatus according to the present invention is described with reference to Tables 3 and 4.

The dimensions of the present embodiment of the Fourier transform optical apparatus are obtained by the following procedure:

Step 1. Give the composite focal length fs, focal length f2 of concave lens 2, front focal length Ff, and back focal length Bf.

Step 2. Give the initial value f1 of the focal length of first convex lens 2.

Step 3. Obtain x, the distance between concave lens 3 and the back focal plane of first convex lens 2, by the equation (3).

Step 4. Using this value of x, obtain d1, the distance between first convex lens 2 and concave lens 3, from the equation (4), and obtain B from the equation (5).

Step 5. Obtain f3 from the equation (8), which represents a relationship on image formation by second convex lens, i.e. the condition of being focal.

Step 6. Compare the focal length f1 of first convex lens 2 with the focal length f3 of second convex lens 4 to stop the procedure if f1=f2 and proceed with Step 7 otherwise.

Step 7. Increment the focal length f1 of first convex lens 2 by Δf1 and return to Step 3.

The dimensions of a Fourier transform apparatus calculated by the above procedure are shown in Tables 3 and 4. Table 3 shows given input values of the present embodiment.

TABLE 3

| Symbol | Description | Value (mm) |
| --- | --- | --- |
| fs | composite focal length | 3125 |
| f2 | Focal length of concave lens | −200 |
| Ff | Front focal length | 50 |
| Bf | Back focal length | 50 |

TABLE 4

| Symbol | Description | Value (mm) |
| --- | --- | --- |
| x | Distance between concave lens and first convex lens | 152 |
| B | Distance between concave lens and the back focal plane of compound first convex lens and concave lens | 641 |
| S1 | Distance between first convex lens and the virtual image point of first convex lens | 54 |
| S' | Distance between concave lens and the front focal plane of second convex lens | 153 |
| d1 | Distance between first convex lens and concave lens | 591 |
| d2 | Distance between concave lens and second convex lens | 591 |
| f1 | Focal length of first convex lens | 743 |
| f3 | Focal length of second convex lens | 743 |

As a result of the above calculation, the total length of the lens system is d1+d2=1182 mm. With the addition of the back focal length Bf and front focal length Ff, the total length of the Fourier transform optical apparatus becomes 1282 mm.

Consequently, the present embodiment has a great effect that the total length of the optical system can be reduced to 20.5% of the prior system of 6250 mm in total length. Further, the present embodiment can use the same lenses both for first convex lens 2 and for second convex lens 4 by equalizing their focal lengths.

Figure 5:
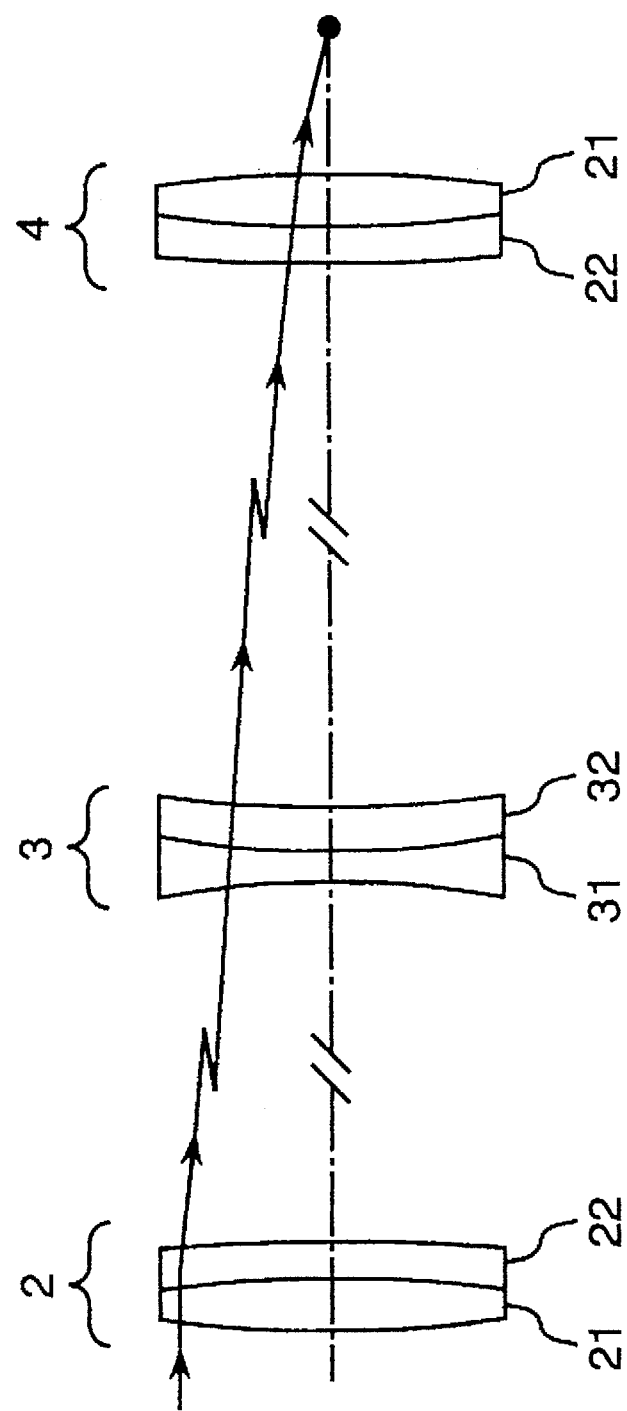
FIG. 5 shows the cross section of the lens system of a third embodiment of the Fourier transform optical apparatus according to the present invention.

Next, a third embodiment of the Fourier transform optical apparatus according to the present invention is described with reference to FIG. 5. In FIG. 5, components having the same functions as in FIGS. 1, 2 or 3 are denoted by the same numerals.

. 21 is a convex lens and constitutes the first and second surfaces of first convex lens 2 and also the second and third surfaces of second convex lens 4. 22 is a meniscus lens, constitutes the second and third surfaces of first convex lens 2, and functions as a concave lens. Further, the meniscus lens 22 constitutes the first and second surfaces of second convex lens 4 and functions as a concave lens. First convex lens 2 and second convex lens 4 are identical lenses, each being composed of convex lens 21 and meniscus lens 22.

31 is a concave lens and constitutes the first and second surfaces of concave lens 3. 32 is a meniscus lens, constitutes the second and third surfaces of concave lens 3, and functions as a concave lens. Concave lens 3 is a lens composed of concave lens 31 and meniscus lens 32.

The dimensions of convex lens 2, concave lens 3, and second convex lens 4 are obtained by the design procedure Steps 1 to 7 of the embodiment of the Fourier transform optical apparatus defined in claim 2.

Table 5 shows the actual lens composition in the present embodiment, wherein the wavelength is 680 nm.

TABLE 5

| # | r (mm) | d (mm) | n (at 680 nm) |
| --- | --- | --- | --- |
| 1 | 540.5 | 10.1 | 1.64055(SF2) |
| 2 | −408.9 | 10.1 | 1.77359(SF11) |
| 3 | −1635.0 | 590.5 | Air |
| 4 | −310.8 | 9.9 | 1.79363(SF6) |
| 5 | 232.7 | 9.9 | 1.51315(BK7) |
| 6 | 434.8 | 590.5 | Air |
| 7 | 1635.0 | 10.1 | 1.77359(SF11) |
| 8 | 408.9 | 10.1 | 1.64055(SF2) |
| 9 | −540.5 | | Air |

Figure 6:
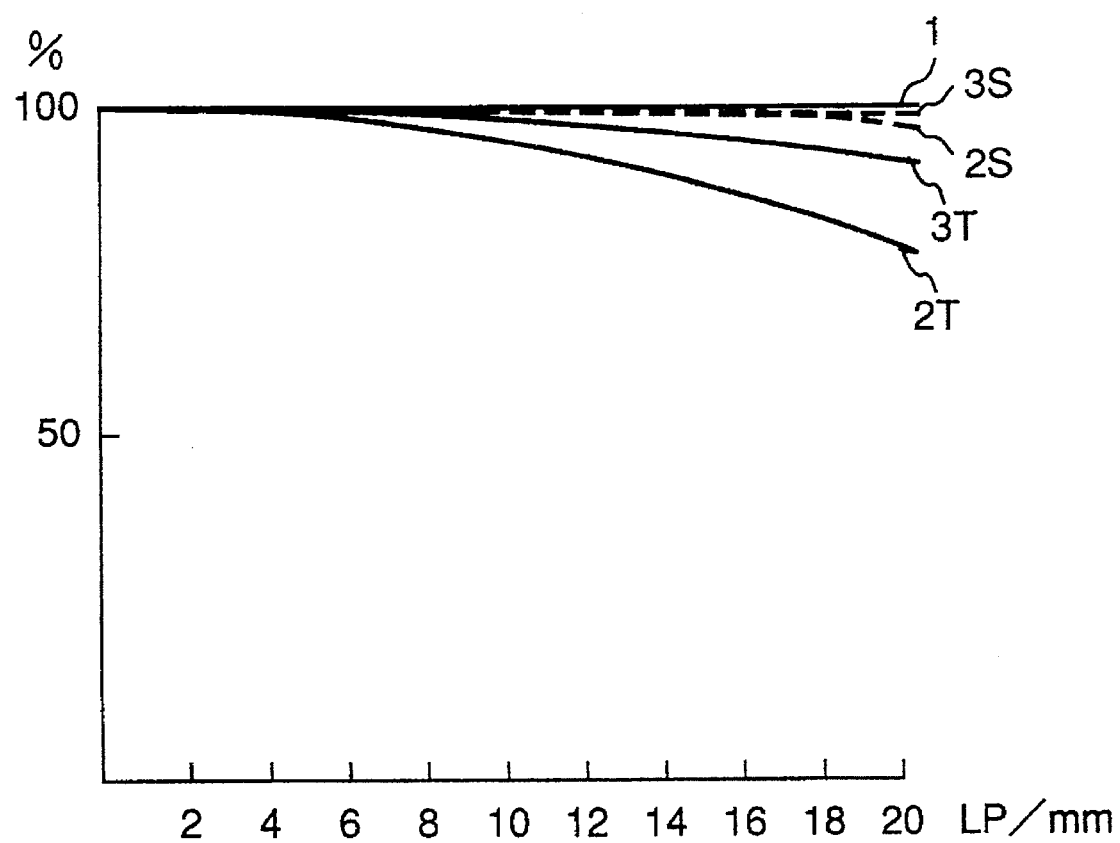
FIG. 6 shows the MTF characteristics that express the image formation of the pupil in the embodiment of FIG. 5.
Figure 7:
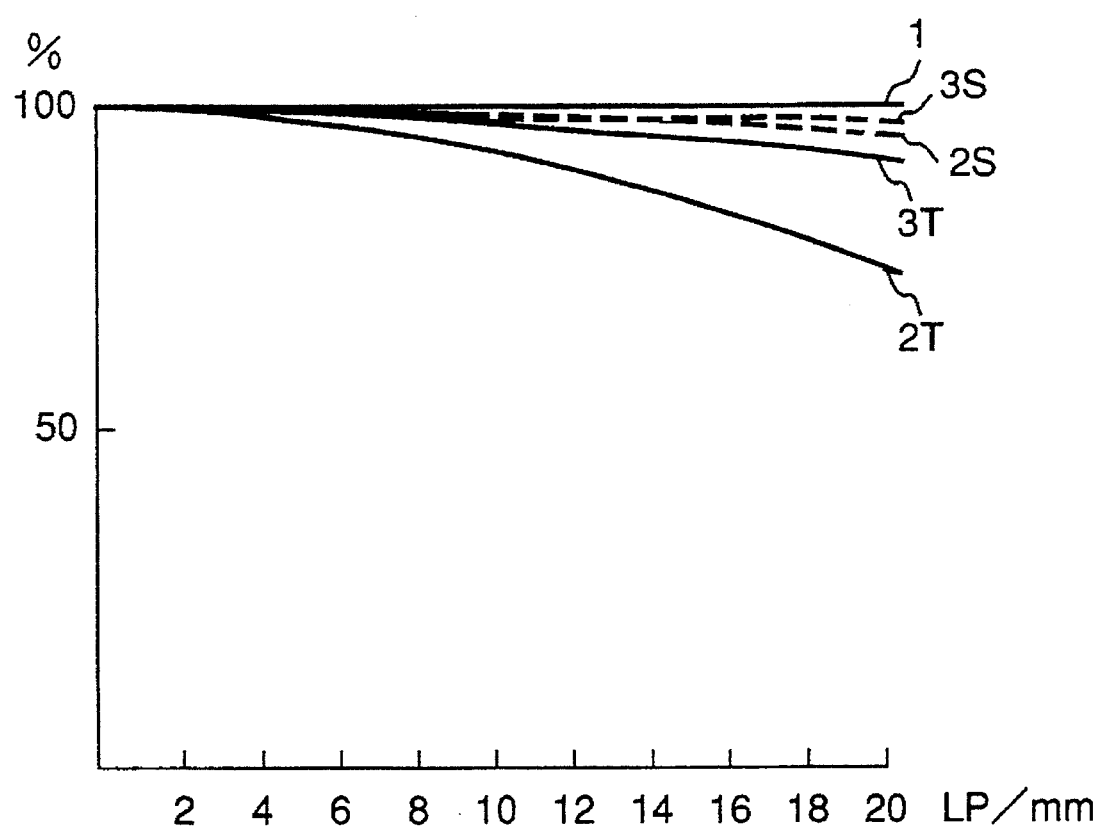
FIG. 7 shows the MTF characteristics that express the image formation of the object in the embodiment of FIG. 5.
Figure 8:
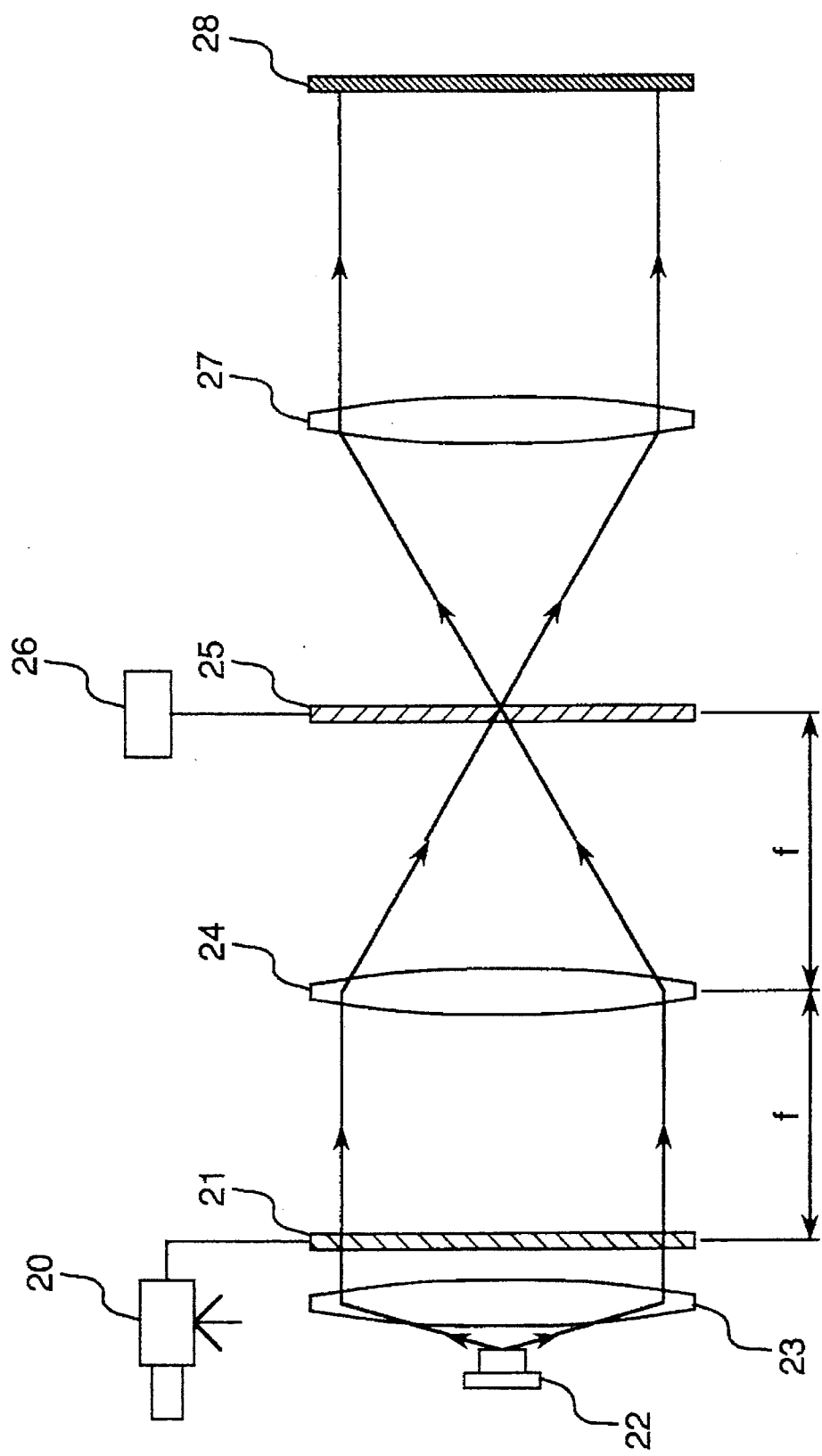
FIG. 8 shows a block diagram of a prior optical information processing system.

For the image formation characteristics of the Fourier transform optical apparatus of the lens composition shown in Table 5, the modulation transfer function (MTF) characteristics are shown in FIGS. 6 and 7. FIG. 6 evaluates the image formation characteristics of the pupil indicated by the solid line in FIG. 2. The MTF is illustrated in case a parallel light beam is made incident from the left side of the Fourier transform optical apparatus. FIG. 7 evaluates the image formation of the object indicated by the broken line in FIG. 2. The MTF is illustrated in case a parallel light beam is made incident from the right side of the Fourier transform optical apparatus.

The abscissa of FIGS. 6 and 7 indicates spatial frequency (LP/mm). Number 1 indicates the ray on the optical axis, number 2 indicates the ray of the maximum field angle, and number 3 indicates the ray of 70% of the maximum field angle. Further, S indicates the sagittal plane, and T indicates the tangential plane. Here, the maximum field angle is given by $Tan^{-1}$ (30/3125)=0.55°, since the height of the Fourier transform image from the optical axis is made 30 mm.

From the MTFs shown in FIGS. 6 and 7, it is observed that the sufficient characteristics of image formation of both the pupil and object have been obtained for the spatial frequency 10 LP/mm obtained from the pixel pitch 50 μm of spatial light modulator.

Effects of each lens of the Fourier transform optical apparatus shown in FIG. 5 on the characteristics of image formation are discussed in the following.

First, second convex lens 4 has little effect on image formation of the pupil, since second convex lens it is set near the focal plane. Therefore, it is necessary that first convex lens 2, at which ray height is great, should eliminate spherical aberration, and concave lens 3 should eliminate coma and astigmatism.

On the other hand, since first convex lens 2 is set near the focal plane, first convex lens 2 has little effect on image formation of the object. Therefore, it is necessary that second convex lens 4, at which ray height is great, should eliminate spherical aberration, and concave lens 3 should eliminate coma and astigmatism.

From the above discussion, the following conditions are obtained. First, in order to reduce coma and astigmatism at concave lens 3, it is necessary that $0.9 \times f2 < r5$,   Condition (1)

$0.1 < n4 - n5 < 0.3$.   Condition (2)

In order to reduce spherical aberration at first convex lens 2, it is necessary that $0.4 \times f1 < r1 < 0.75 \times f1$,   Condition (3)

$0.15 < n2 - n1 < 0.25$.   Condition (4)

Here r5 is the radius of curvature of the cemented surface of concave lens 3, n4 and n5 are respectively the refractive indices of the glass materials of concave lens 31 and convex lens 32, which constitute concave lens 3, r1 is the radius of curvature of the non-cemented surface of convex lens 21, which is a component of first convex lens 2, and n1 and n2 are respectively the refractive indices of glass materials of convex lens 21 and concave lens 22, which constitute first convex lens 2 and second convex lens 4.

As described above, according to the first preferred embodiment of the Fourier transform optical apparatus according to the present invention, the lens system composed of a first convex lens set near the display medium of the input image, a concave lens, and a second convex lens set near the composite focal plane of the first convex lens and concave lens can shorten the length of the light path.

Further, according to the second preferred embodiment of the Fourier transform optical apparatus of the present invention, the lens system composed of a first convex lens set near the display medium of the input image, a concave lens, and a second convex lens set near the composite focal plane of first convex lens and the concave lens can shorten the length of the light path and can cut down the costs of the optical system by equalizing the focal length of the first and second convex lenses.

Still further, according to the third preferred embodiment of the Fourier transform optical apparatus of the present invention, the lens system composed of a first convex lens obtained by cementing a convex lens and a concave lens and set near the display medium of the input image, a concave lens obtained by cementing a convex lens and a concave lens, and a second convex lens which is the same as the first convex lens but set with its faces reversed near the composite focal plane of the first convex lens and the concave lens can shorten the length of the light path and obtain good characteristics of image formation.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A Fourier transform optical apparatus for optically Fourier transforming an input image, comprising:
   a display means for displaying an input image;
   a light source for irradiating the input image displayed on said display means;
   a first convex lens and a first concave lens combined with one another to form a focal optical system and arranged near said display means; and
   second convex lens arranged near a composite focal plane of said focal optical system,
   wherein a light ray passing an intersection of said display means and an optical axis of said Fourier transform optical apparatus becomes a light ray parallel to said optical axis after passing through said second convex lens and a light ray incident to said first convex lens in parallel to said optical axis is focused at a composite focal point of said focal optical system and said second convex lens.

2. A Fourier transform optical apparatus for optically Fourier transforming an input image, comprising a display means for displaying an input image, a light source for irradiating the input image displayed on said display means, a first convex lens arranged near the display means of the input image, a concave lens, and a second convex lens arranged near the composite focal plane of said first convex lens and concave lens,
   wherein the composite focal length of said Fourier transform optical apparatus is fs, the focal length of said first convex lens is f1, the focal length of said concave lens is f2, and the front focal length and back focal length of said Fourier transform apparatus are respectively Ff and Bf,
   wherein the distance x between said concave lens and said first convex lens and the distance d1 between said first convex lens and concave lens are given by $$x=|f2|-f1 \cdot |f2|/fs,$$

$$d1=f1-x,$$

the distance B between said concave lens 3 and the back focal plane of the compound said first convex lens and concave lens is given by $$B=(x \cdot |f2|)/(-x+|f2|),$$

the distance S1 between said first convex lens and a virtual image point of said first convex lens, the virtual image point being the location of a virtual image displayed by said display means, is given by $$S1=(f1 \cdot Ff)/(Ff-f1),$$

the distance S' between the front focal plane of said second convex lens and said concave lens is given by $$S'=-\{(d1+S1) \cdot |f2|\}/(d1+S1+|f2|),$$

and the focal length f3 of said second convex lens is given by $$f3=B-Bf-S'.$$

3. A Fourier transform optical apparatus for optically Fourier transforming an input image, comprising a display means for displaying an input image, a light source for irradiating the input image displayed on said display means, a first convex lens arranged near the display means of the input image, a concave lens, and a second convex lens arranged near the composite focal plane of said first convex lens and concave lens,
   wherein assuming the composite focal length of said Fourier transform optical apparatus is fs, the focal length of said first convex lens is f1, the focal length of said concave lens is f2, and the front focal length and back focal length of said Fourier transform apparatus are respectively Ff and Bf,
   wherein the distance x between said concave lens and said first convex lens and the distance d1 between said first convex lens and concave lens are given by $$x=|f2|-f1 \cdot |f2|/fs,$$

$$d1=f1-x,$$

the distance B between said concave lens 3 and the back focal plane of the compound said first convex lens and concave lens is given by $$B=(x\cdot|f2|)/(-x+|f2|),$$

the distance S1 between said first convex lens and a virtual image point of said first convex lens, the virtual image point being the location of a virtual image displayed by said display means, is given by $$S1=(f1\cdot Ff)/(Ff-f1),$$

the distance S' between the front focal plane of said second convex lens and said concave lens is given by $$S'=-\{(d1+S1)\cdot|f2|\}/(d1+S1+|f2|),$$

the focal length f3 of said second convex lens is given by $$f3=B-Bf-S',$$

and the focal length f1 of said first convex lens is equal to the focal length f3 of said second convex lens.

4. A Fourier transform optical apparatus for optically Fourier transforming an input image, comprising a display means for displaying an input image, a light source for irradiating the input image displayed on said display means, a first convex lens obtained by cementing a convex lens and a concave lens and set near the display medium of the input image, a concave lens obtained by cementing a convex lens and a concave lens, and a second convex lens which is the same as said first convex lens but set with its faces reversed near the composite focal plane of said first convex lens and said concave lens, wherein the composite focal length of said Fourier transform optical apparatus is fs, the focal length of said first convex lens is f1, the focal length of said concave lens is f2, and the front focal length and back focal length of said Fourier transform apparatus are respectively Ff and Bf, the distance x between said concave lens and said first convex lens and the distance d1 between said first convex lens and concave lens are given by $$x=|f2|-f1\cdot|f2|/fs,$$

$$d1=f1-x,$$

the distance B between said concave lens 3 and the back focal plane of the compound said first convex lens and concave lens is given by $$B=(x\cdot|f2|)/(-x+|f2|),$$

the distance S1 between said first convex lens and a virtual image point of said first convex lens, the virtual image point being the location of a virtual image displayed by said display means, is given by $$S1=(f1\cdot Ff)/(Ff-f1),$$

the distance S' between the front focal plane of said second convex lens and said concave lens is given by $$S'=-\{(d1+S1)\cdot|f2|\}/(d1+S1+|f2|),$$

and, wherein the radius of curvature of the cemented surface of said concave lens is r5, $$0.9\times f2 < r5,$$

the refraction indices of the glass materials of the concave lens and convex lens that constitute said concave lens are respectively n4 and n5, $$0.1 < n4-n5 < 0.3,$$

the radius of curvature of the non-cemented surfaces of said first convex lens is r1, $$0.4\times f1 < r1 < 0.75\times f1,$$

and the refraction indices of the glass materials of the convex lens and concave lens that constitute said first convex lens are respectively n1 and n2, $$0.15 < n2-n1 < 0.25.$$

5. An optical information processing apparatus comprising a Fourier transform optical apparatus for optically Fourier transforming an input image, and a spatial light modulator arranged at the back focal plane of said Fourier transform optical apparatus on which a Fourier transform computer generated hologram of a predetermined pattern is displayed, said Fourier transform optical apparatus comprising a display means for displaying an input image, a light source for irradiating the input image displayed on said display means, a first convex lens and a first concave lens combined with one another to form a focal optical system and arranged near said display means and second convex lens arranged near a composite focal plane of said focal optical system, wherein a light ray passing an intersection of said display means and an optical axis of said Fourier transform optical apparatus becomes a light ray parallel to said optical axis after passing through said second convex lens and a light ray incident to said first convex lens in parallel to said optical axis is focused at a composite focal point of said focal optical system and said second convex lens, and wherein a Fourier transform image of the image input to said Fourier transform optical apparatus is formed on said spatial light modulator by said Fourier transform optical apparatus, and said Fourier transform image and said Fourier transform computer generated hologram are superimposed.

6. An optical information processing apparatus having a Fourier transform optical apparatus for optically Fourier transforming an input image, and a spatial light modulator set at the back focal plane of said Fourier transform optical apparatus on which a Fourier transform computer generated hologram of a predetermined pattern is displayed, said Fourier transform optical apparatus comprising a display means for displaying an input image, a light source for irradiating the input image displayed on said display means, a first convex lens arranged near the display means of the input image, a concave lens, and a second convex lens arranged near the composite focal plane of said first convex lens and concave lens, wherein the composite focal length of said Fourier transform optical apparatus is fs, the focal length of said first convex lens is f1, the focal length of said concave lens is f2, and the front focal length and back focal length of said Fourier transform apparatus are respectively Ff and Bf, wherein the distance x between said concave lens and said first convex lens and the distance d1 between said first convex lens and concave lens are given by $$x=|f2|-f1\cdot|f2|/fs,$$

$$d1=f1-x,$$

the distance B between said concave lens 3 and the back focal plane of the compound said first convex lens and concave lens is given by $$B=(x\cdot|f2|)/(-x+|f2|),$$

the distance S1 between said first convex lens and a virtual image point of said first convex lens, the virtual image point being the location of a virtual image displayed by said display means, is given by $$S1=(f1\cdot Ff)/(Ff-f1),$$

the distance S' between the front focal plane of said second convex lens and said concave lens is given by $$S'=-\{(d1+S1)\cdot|f2|\}/(d1+S1+|f2|),$$

and the focal length f3 of said second convex lens is given by $$f3=B-Bf-S',$$

wherein a Fourier transform image of the image input to said Fourier transform optical apparatus is formed on said spatial light modulator by said Fourier transform optical apparatus, and said Fourier transform image and said Fourier transform computer generated hologram are superimposed.

7. An optical information processing apparatus having a Fourier transform optical apparatus for optically Fourier transforming an input image, and a spatial light modulator set at the back focal plane of said Fourier transform optical apparatus on which a Fourier transform computer generated hologram of a predetermined pattern is displayed, said Fourier transform optical apparatus comprising a display means for displaying an input image, a light source for irradiating the input image displayed on said display means, a first convex lens arranged near the display means of the input image, a concave lens, and a second convex lens arranged near the composite focal plane of said first convex lens and concave lens, and wherein the composite focal length of said Fourier transform optical apparatus is fs, the focal length of said first convex lens is f1, the focal length of said concave lens is f2, and the front focal length and back focal length of said Fourier transform apparatus are respectively Ff and Bf, wherein the distance x between said concave lens and said first convex lens and the distance d1 between said first convex lens and concave lens are given by $$x=|f2|-f1\cdot|f2|/fs,$$

$$d1=f1-x,$$

the distance B between said concave lens 3 and the back focal plane of the compound said first convex lens and concave lens is given by $$B=(x\cdot|f2|)/(-x+|f2|),$$

the distance S1 between said first convex lens and a virtual image point of said first convex lens, the virtual image point being the location of a virtual image displayed by said display means, is given by $$S1=(f1-Ff)/(Ff-f1),$$

the distance S' between the front focal plane of said second convex lens and said concave lens is given by $$S'=-\{(d1+S1)\cdot|f2|\}/(d1+S1+|f2|),$$

the focal length f3 of said second convex lens is given by $$f3=B-Bf-S',$$

and the focal length f1 of said first convex lens is equal to the focal length f3 of said second convex lens and wherein a Fourier transform image of the input image of said Fourier transform optical apparatus is formed on said spatial light modulator by said Fourier transform optical apparatus, and said Fourier transform image and said Fourier transform computer generated hologram are superimposed.

8. An optical information processing apparatus comprising a Fourier transform optical apparatus for optically Fourier transforming an input image, and a spatial light modulation means arranged at the back focal plane of said Fourier transform optical apparatus on which a Fourier transform computer generated hologram of a predetermined pattern is displayed, said Fourier transform optical apparatus comprising a display means for displaying an input image, a light source for irradiating the input image displayed on said display means, a first convex lens obtained by cementing a convex lens and a concave lens and set near the display medium of the input image, a concave lens obtained by cementing a convex lens and a concave lens, and a second convex lens which is the same as said first convex lens but set with its faces reversed near the composite focal plane of said first convex lens and said concave lens, wherein the composite focal length of said Fourier transform optical apparatus is fs, the focal length of said first convex lens is f1, the focal length of said concave lens is f2, and the front focal length and back focal length of said Fourier transform apparatus are respectively Ff and Bf, wherein the distance x between said concave lens and said first convex lens and the distance d1 between said first convex lens and concave lens are given by $$x=|f2|-f1\cdot|f2|/fs,$$

$$d1=f1-x,$$

the distance B between said concave lens 3 and the back focal plane of the compound said first convex lens and concave lens is given by $$B=(x\cdot|f2|)/(-x+|f2|),$$

the distance S1 between said first convex lens and a virtual image point of said first convex lens, the virtual image point being the location of a virtual image displayed by said display means, is given by $$S1=(f1-Ff)/(Ff-f1),$$

the distance S' between the front focal plane of said second convex lens and said concave lens is given by $$S'=-\{(d1+S1)\cdot|f2|\}/(d1+S1+|f2|),$$

and, wherein the radius of curvature of the cemented surface of said concave lens is r5, $$0.9\times f2 < r5,$$

the refraction indices of the glass materials of the concave lens and convex lens that constitute said concave lens are respectively n4 and n5, $$0.1 < n4-n5 < 0.3,$$

the radius of curvature of the noncemented surfaces of said first convex lens is r1, $$0.4 \times f1 < r1 < 0.75 \times f1,$$

and the refraction indices of the glass materials of the convex lens and concave lens that constitute said first convex lens are respectively n1 and n2, $$0.15 < n2-n1 < 0.25, \text{ and}$$

wherein a Fourier transform image of the input image of said Fourier transform optical apparatus is formed on said spatial light modulator by said Fourier transform optical apparatus, and said Fourier transform image and said Fourier transform computer generated hologram are superimposed.

\* \* \* \* \*